United States Patent
Traverso et al.

(10) Patent No.: US 8,056,403 B2
(45) Date of Patent: Nov. 15, 2011

(54) METHOD OF ANALYSIS OF SECONDARY-AIR CIRCUITS IN GAS-TURBINE PLANTS

(75) Inventors: Stefano Traverso, Genoa (IT); Luca Bozzi, Genoa (IT)

(73) Assignee: Ansaldo Energia S.p.A., Genoa (IT)

( * ) Notice: Subject to any disclaimer, the term of this patent is extended or adjusted under 35 U.S.C. 154(b) by 411 days.

(21) Appl. No.: 12/376,030

(22) PCT Filed: Jul. 25, 2007

(86) PCT No.: PCT/EP2007/057691
§ 371 (c)(1),
(2), (4) Date: May 29, 2009

(87) PCT Pub. No.: WO2008/015145
PCT Pub. Date: Feb. 7, 2008

(65) Prior Publication Data
US 2010/0005869 A1 Jan. 14, 2010

(30) Foreign Application Priority Data
Jul. 31, 2006 (EP) .................................. 06425546

(51) Int. Cl.
*G01M 15/14* (2006.01)
(52) U.S. Cl. .................................................. 73/112.01
(58) Field of Classification Search ............... 73/112.01, 73/112.03
See application file for complete search history.

(56) References Cited

U.S. PATENT DOCUMENTS 7,971,473 B1 * 7/2011 Meunier et al. ............. 73/112.01
2010/0058730 A1 * 3/2010 Sonoda et al. ................ 60/39.12

OTHER PUBLICATIONS

Carlo Carcasci, et al., "Hevy Duty Gas Turbine Simulation: Global Performances Estimation and Secondary Air System Modifications", Proceedings of GT2006, XP008073630, vol. 4, May 8-11, 2006. pp. (527-536) 1-10.

Francesco Casella, "Modelling, simulation and control of a geothermal plant", "Simulation of Power Generation Processes Based on Decoupling", Tesi Di Dottorato, XP002417859, paragraph [3.3.1]—paragraph [3.3.2], 1998, pp. 27-54.

G. Crosa, at al., "Heavy-Duty Gas Turbine Plant Aerothermodynamic Simulation Using Simulink", The American Society of Mechanical Engineers, ASME Turbo Asia Conference, XP008073400, Nov. 5-7, 1996, pp. 1-8.

A. W. Reichert. et al., "Loss Prediction for Rotating Passages in Secondary Air Systems". The American Society of Mechanical Engineers, Proceedings of the 1997 International Gas Turbine & Aeroengine Congress & Exhibition, XP008074439, Jun. 2-5, 1997, pp. 1-8.

Luca Bozzi, et al., "Simplified Simulation Block Diagram of Twin-Shaft Gas Turbines", The American Society of Mechanical Engineers, ASME Turbo Expo 2003, XP008073398, vol. 1, Jun. 16-19, 2003, pp. 519-526.

D. Brillert, et al., "Application of Conjugate CFD to the Internal Cooling Air Flow System of Gas Turbines", The American Society of Mechanical Engineers, ASME Turbo Expo 2003, XP008074441, vol. 5B. Jun. 16-19, 2003. pp. 1051-1060.

* cited by examiner

*Primary Examiner* — Eric S McCall
(74) *Attorney, Agent, or Firm* — Oblon, Spivak, McClelland, Maier & Neustadt, L.L.P.

(57) ABSTRACT

A method of analysis of secondary-air circuits in gas-turbine plants includes defining an equivalent fluid-dynamic network of a secondary-air circuit of a gas-turbine plant. The equivalent fluid-dynamic network includes a plurality of elements, organized in branches and connected to nodes. For at least one element of the secondary-air circuit a principal component of flow and at least one auxiliary component of flow are calculated.

10 Claims, 5 Drawing Sheets

US 8,056,403 B2

METHOD OF ANALYSIS OF SECONDARY-AIR CIRCUITS IN GAS-TURBINE PLANTS

TECHNICAL FIELD

The present invention relates to a method of analysis of secondary-air circuits in gas-turbine plants.

BACKGROUND ART

As is known, in a gas-turbine plant the secondary-air circuit is a fluid network that takes a part of the flow of air from the compression line and uses it for cooling the mechanical components of the turbine exposed to the action of hot gases, in particular the fixed and mobile blades.

The efficiency of the secondary-air circuit has a marked effect both on the overall efficiency of the gas turbine and also on the pollutant emissions. There is thus evident the importance of methods that enable study and analysis of the behaviour of the secondary-air network and its interactions with the other sections of the plant (compressor and turbine).

The methods of analysis currently available are not, however, satisfactory, principally because they do not enable an adequate modelling of the secondary-air circuit. In particular, it is not possible to take adequately into account characteristic loss elements and work and heat exchanges that occur with the hot parts of the turbine.

DISCLOSURE OF INVENTION

The aim of the present invention is therefore to provide a method of analysis of secondary-air circuits in gas-turbine plants that will enable the limitations described above to be overcome.

According to the present invention, a method of analysis of secondary-air circuits in gas-turbine plants is provided as claimed in claim 1.

BRIEF DESCRIPTION OF THE DRAWINGS

The present invention will now be described with reference to the annexed drawings, which illustrates a non-limiting example of embodiment thereof and in which.

BEST MODE FOR CARRYING OUT THE INVENTION

Figure 1:
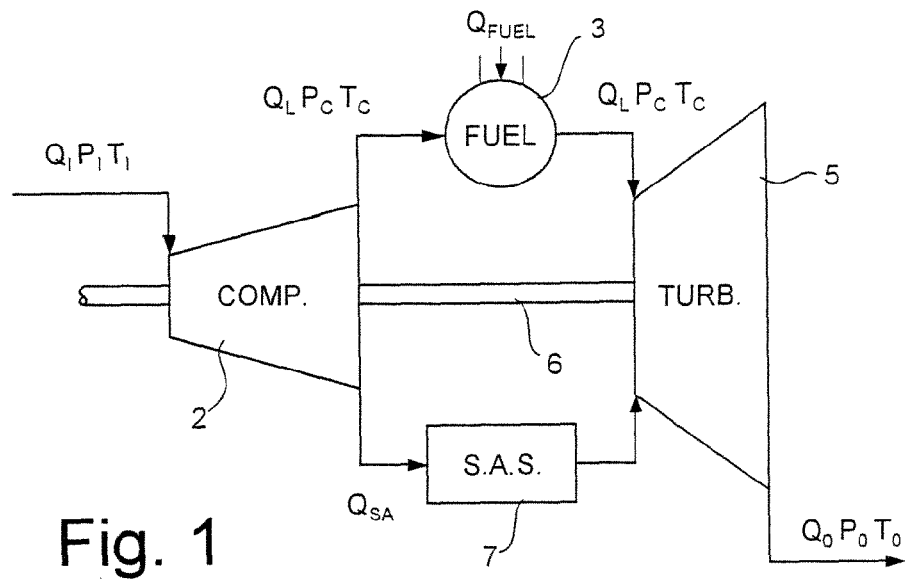
FIG. 1 is a simplified block diagram of a gas-turbine plant.

The following description will make reference to a gas-turbine plant for the production of electric power of the type designated as a whole by 1 in FIG. 1. The plant 1 comprises a compressor 2, a combustion chamber 3, a turbine 5, fitted on the same shaft 6 as the compressor 2, and a secondary-air circuit 7.

The compressor 2 draws from outside an input flow rate $Q_I$ of air, with pre-determined conditions of input pressure and temperature $P_I$, $T_I$. A fraction of the input flow rate $Q_I$, referred to as secondary air flow rate $Q_{SA}$, is extracted by the secondary-air circuit 7 and used for cooling and sealing the mechanical components of the plant 1 in contact with the hot gases. For reasons of simplicity, in this case, a gas-turbine plant with just one extraction of secondary air at output from the compressor (FIG. 1) is considered.

The remaining fraction of the input flow rate $Q_I$, hereinafter referred to as work flow rate $Q_L$, is sent to the combustion chamber 3 (where a fuel flow $Q_{COMB}$ is supplied) and to the turbine 5 for the production of work according to the thermodynamic cycle envisaged for the plant 1. The turbine 5 emits an output flow $F_O$ of exhaust gas.

Hereinafter, the following definitions will moreover be used:

compressor pressure $P_C$ and compressor temperature $T_C$: these designate the pressure and the temperature of the work air flow rate $Q_L$ (and also of the secondary air flow rate $Q_{SA}$) at output from the compressor 2;

turbine pressure $P_T$ and turbine temperature $T_T$: these designate the pressure and the temperature of the work flow rate $Q_L$ at input to the turbine 5;

output pressure $P_O$ and output temperature $T_O$: these designate the pressure and the temperature of the output flow $F_O$ at discharge from the turbine 5.

Figure 2:
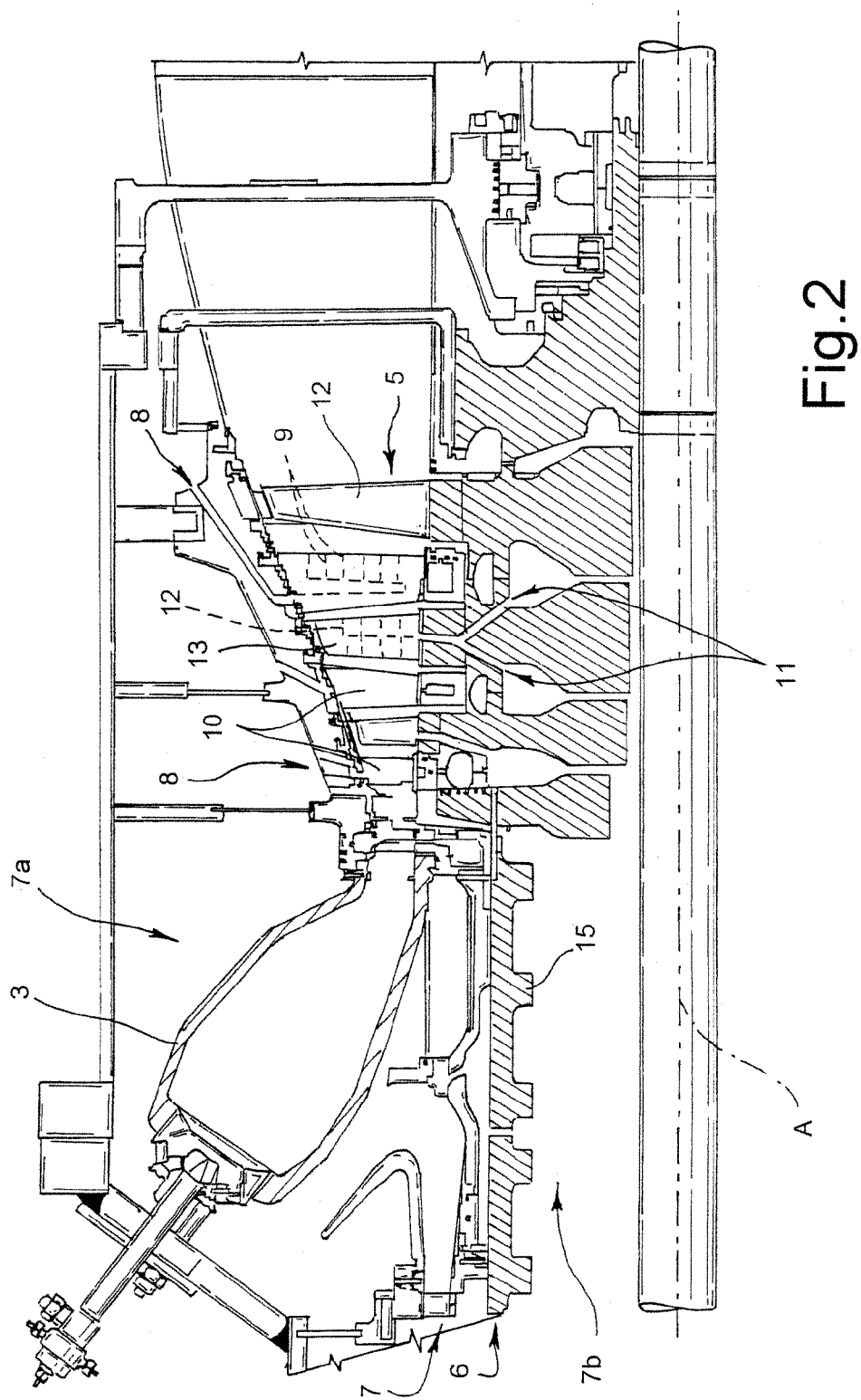
FIG. 2 shows a longitudinal section of a part of the plant represented schematically in FIG. 1.

As is illustrated in FIG. 2, the secondary-air circuit 7 comprises a plurality of elements connected together, in particular pipes and chambers. A first portion 7a of the secondary-air circuit 7, basically comprising fixed parts, extends around the combustion chamber 3 and the blade holder of the turbine 5 and moreover includes stator passages 8 for conveying air within cooling pipes 9 provided in the stator blades 10 of the turbine 5. A second portion 7b of the secondary-air circuit 7 is made in part within the shaft 6 and comprises rotating passages 11 for conveying air within cooling pipes 12 made in the rotor blades 13. Consequently, elements that define the second portion 7b of the secondary-air circuit 7 turn about an axis of rotation of the shaft 6.

Figure 3:
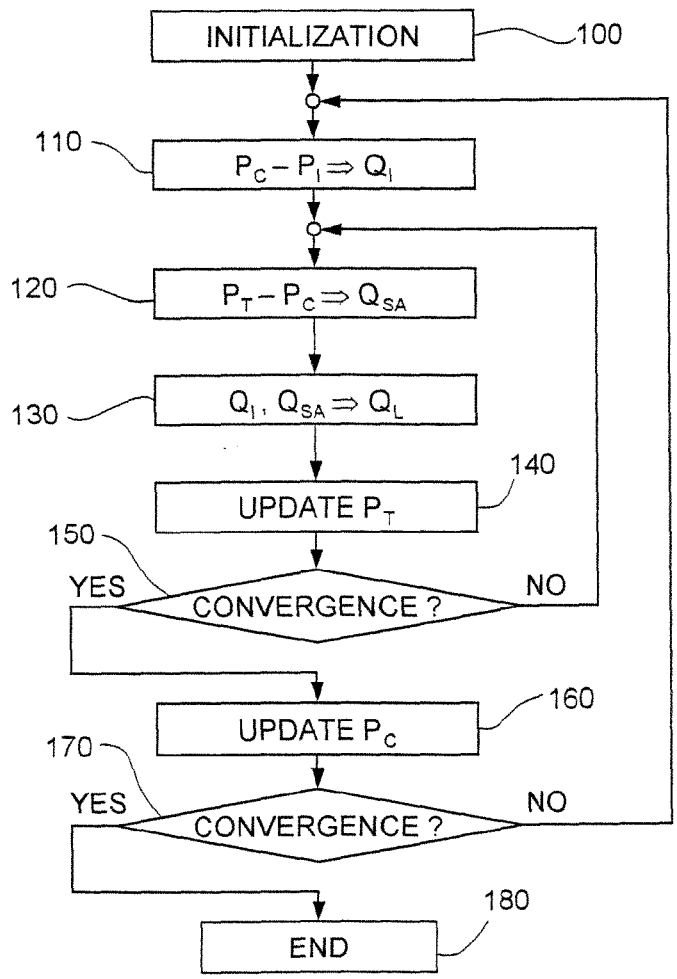
FIG. 3 is a simplified flowchart for a procedure that uses the method according to the invention.

FIG. 3 shows a flowchart for an iterative calculation procedure for analysis of the main fluid-dynamic quantities present in the plant 1. The calculation is made considering the pressure and the temperature of the fluid in the different sections of the plant constant for the duration of each iteration.

In the first place (block 100), the compressor pressure $P_C$, the compressor temperature $T_C$, the turbine pressure $P_T$, and the turbine temperature $T_T$ are initialized, assigning respective values.

Next (block 110), the input flow rate $Q_I$ of the compressor 2 is calculated starting from the difference between the compressor pressure $P_C$ and the input pressure $P_I$. The calculation is made in a way in itself known, using a purposely provided solution module (not illustrated).

Then (block 120), the secondary air flow rate $Q_{SA}$ is calculated on the basis of the pressure differential present on the secondary-air circuit 7, i.e., on the basis of the difference between the turbine pressure $P_T$ and the compressor pressure $P_C$ (possibly, in the case of complex secondary-air circuits, with several extraction points and inlet points connected by branches, the pressure differential present on the different branches is considered). For this purpose, a specific procedure for calculation of the turbine pressure $P_T$ is run, which will be described in detail hereinafter.

The secondary air flow rate $Q_{SA}$ is then subtracted from the input flow rate $Q_I$ to determine the work flow rate $Q_L$ supplied to the turbine 5 (block 130). In addition to the difference $Q_I$-$Q_{SA}$, also a flow rate of fuel injected into the combustion chamber 3 (not illustrated herein explicitly for reasons of simplicity) is of course taken into consideration.

The work flow rate $Q_L$ thus determined is then used to derive, in a way in itself known, new values of the turbine pressure $P_T$ (block 140), which are available for a new iteration of the calculation. In particular, in the case of complex secondary-air circuits, the calculation of the turbine pressure $P_T$ takes into account the introduction, in different points of the turbine 5, of respective fractions of the overall secondary air flow rate $Q_{SA}$, here not considered for reasons of simplicity. The compressor pressure $P_C$ is derived from the turbine pressure $P_T$ on the basis of equations that describe operation of the combustion chamber 3.

The secondary air flow rate $Q_{SA}$ (block 120) and the work flow rate $Q_L$ (block 130) are iteratively recalculated until a first convergence test is passed (block 150). When the test is passed (output YES from block 150), the compressor pressure $P_C$ is calculated (block 160), which is also made available for a new iteration of the calculation.

A second convergence test is then conducted (block 170). For example, the stability of the value of compressor pressure $P_C$, calculated on a pre-determined number of iterations, is checked. If the convergence test is passed (output YES from block 170), the calculation procedure terminates (block 180); otherwise (output NO from block 170), a new iteration is run, using the new values of the turbine pressure $P_T$ and of the compressor pressure $P_C$ just calculated.

The procedure for the calculation of the secondary air flow rate $Q_{SA}$, which regards the secondary-air circuit 7 and the elements that make it up, will be described in greater detail in what follows.

The calculation is made, taking into account the fact that the secondary-air circuit 7, in addition to being a site of heat exchange, comprises both fixed parts (with respect to the stator part of the plant 1) and parts in rotary movement about the axis A (with the rotor of the compressor 2 and of the turbine 5). In particular, the calculation considers, for each element, not only a principal flow direction (to which the component of the velocity vector that defines the flow rate is associated), but also one and, preferably, two auxiliary flow directions, which do not define the flow rate and are perpendicular to the principal flow direction.

Figure 4:
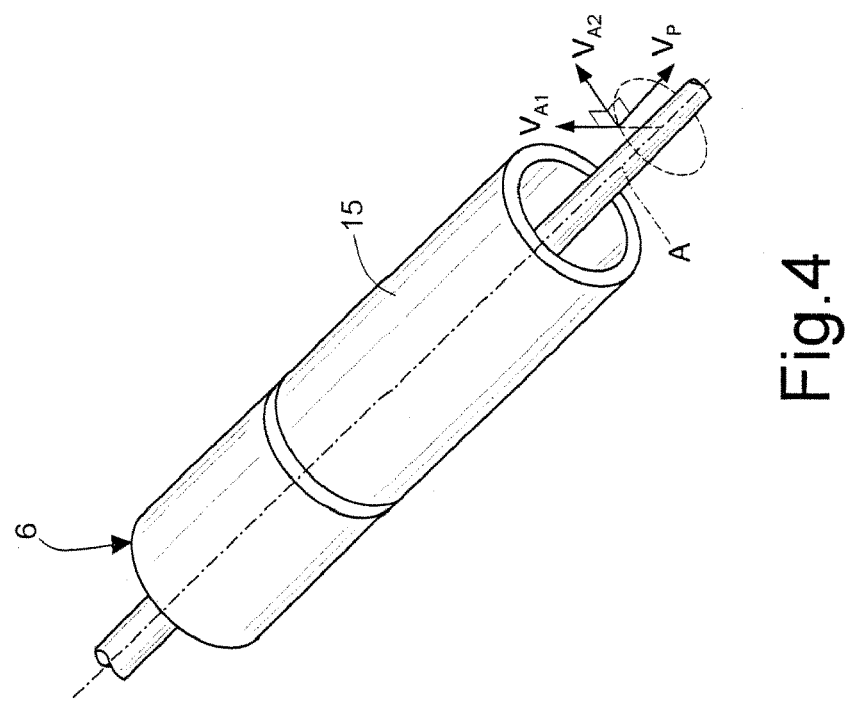
FIG. 4 is a simplified three-quarters perspective view from above of a part of the plant illustrated in FIGS. 1 and 2.

For this purpose consider FIG. 4, which illustrates, by way of example, a section of the secondary-air circuit 7 (in particular, a section of the second rotating section 7b), defined inside a hollow shaft or drum 15. The drum 15 is arranged between the compressor 2 and the turbine 5 in the proximity of the combustion chamber 3. Furthermore, the drum 15 is a rotating cavity with principally axial flow, because its walls are set in rotation by the turbine 5 at an angular velocity ω and the principal flow direction in this case is parallel to the axis A. A first auxiliary flow direction and a second auxiliary flow direction are instead respectively defined, in the case illustrated in FIG. 4, by a radial direction and by a circumferential/tangential direction, with respect to the rotation axis A, which are perpendicular to one another. FIG. 4 shows a principal flow component $V_P$, a first auxiliary flow component $V_{A1}$, and a second auxiliary flow component $V_{A2}$. Hereinafter, by "principal flow component" is meant the component of the angular velocity of the coolant according to the principal flow direction, and by "first auxiliary flow component" and "second auxiliary flow component" are meant the components of the angular velocity of the coolant according, respectively, to the first auxiliary flow direction and the second auxiliary flow direction. The first auxiliary flow component $V_{A1}$ is correlated to the angular velocity ω of the shaft 6 of the turbine 5. The introduction of one or two auxiliary flow components enables definition of a so-called "quasi-3D" (quasi three-dimensional) flow model and evaluation of the effect of the rotation on the secondary air flow rate $Q_{SA}$ and, in practice, on the efficiency of the secondary-air circuit 7 itself.

Figure 5:
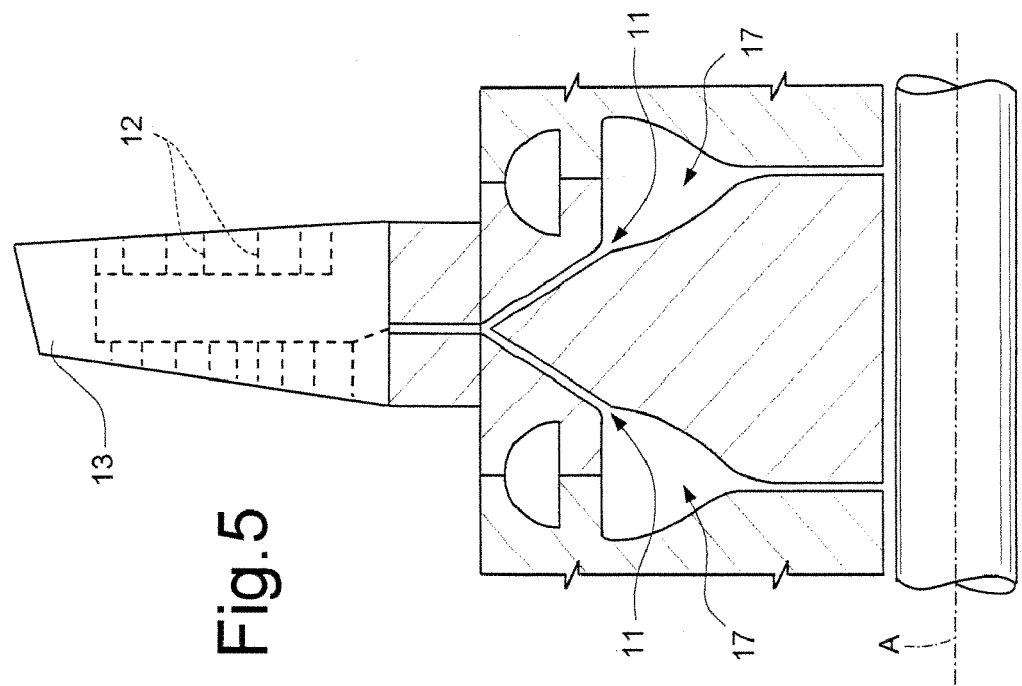
FIG. 5 shows an enlarged detail of FIG. 2.

FIG. 5 shows a different section of the second portion 7b of the secondary-air circuit 7, in particular annular chambers 17, rotating passages 11, and cooling pipes 12, which run within rotor blades 13. The annular chambers 17 are rotating cavities, in which the fluid evolves prevalently in a radial direction. Consequently, the principal flow component is radial, and the first and second auxiliary flow components are perpendicular thereto.

As regards the rotor passages 11 and the cooling pipes 13, the principal flow direction is parallel to the axis of each section thereof. The first auxiliary direction of flow and the second auxiliary flow direction are perpendicular to the principal flow direction and to one another.

The calculation of the auxiliary flow components enables precise quantification of the head losses caused by the complex field of motion that is set up within the rotating elements of the secondary-air circuit.

Figure 6:
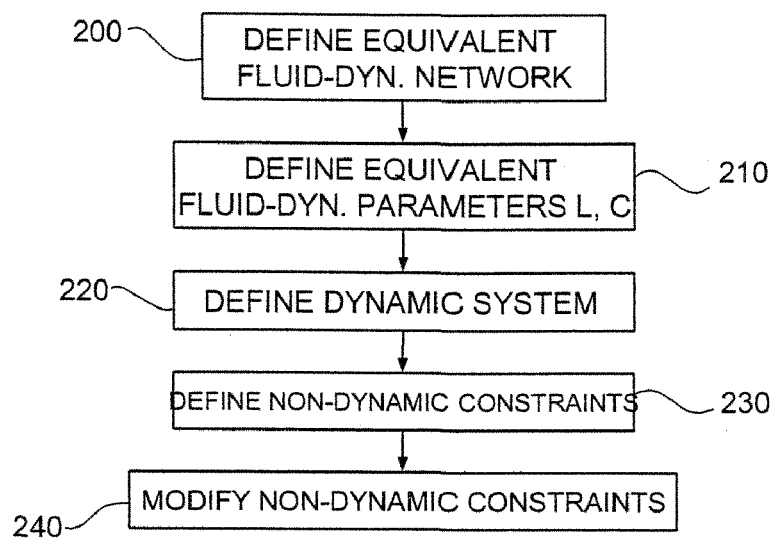
FIG. 6 is a simplified flowchart regarding the present invention.

The calculation of the secondary air flow rate $Q_{SA}$, which involves calculating the flow rates and pressures for each element of the secondary-air circuit 7, is carried out on the basis of an equivalent electrical network, preliminarily defined as described with reference to FIG. 6.

Figure 7:
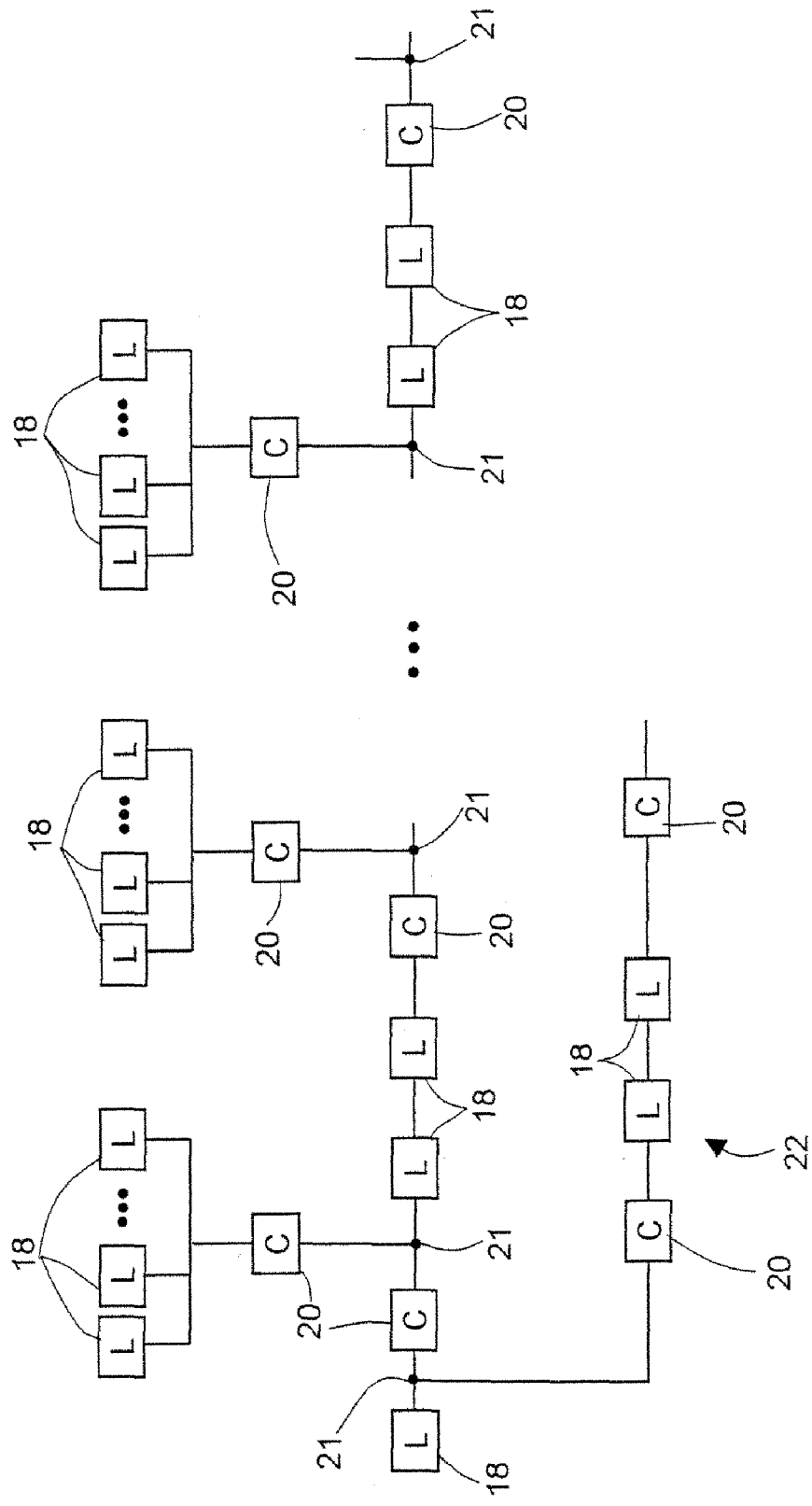
FIG. 7 is an equivalent fluid-dynamic diagram of a part of the plant of FIG. 1.

Initially (block 200), an equivalent fluid-dynamic network 25 of the secondary-air circuit 7 is defined; i.e., the elements present and the corresponding connections (nodes 21 and branches 22, FIG. 7) are identified.

Then, a respective equivalent fluid-dynamic parameter is associated to elements of the secondary-air circuit 7 (block 210). As previously mentioned, in particular, the secondary-air circuit 7 mainly comprises pipes and chambers (designated, respectively, by 18 and 20 in FIG. 7). From the fluid-dynamic standpoint, the pipes 18, which have lengths much greater than the respective diameters, are elements characterized by the accumulation of momentum and are modelled as equivalent fluid-dynamic inductances L. The chambers 20, instead, are characterized by the accumulation of mass and are modelled as equivalent fluid-dynamic capacitances C. The values of the equivalent fluid-dynamic parameters L, C associated to the pipes 18 and to the chambers 20, depend, however, upon the instantaneous conditions of the secondary-air circuit 7, which is affected by variations of regime and by heat exchange. In particular, especially the values of the equivalent fluid-dynamic capacitances C sensibly depend upon the temperature and hence are updated at each iteration of calculation, as explained hereinafter.

The cooling pipes 18 made in the stator blades 10 and in the rotor blades 13, which constitute the terminal elements of the equivalent fluid-dynamic network, are represented in a schematic and synthetic way by means of characteristic curves and surfaces (in the case in point parametric curves and surfaces, functions of the main thermo-fluid-dynamic parameters of operation, such as supply pressure and temperature of the coolant to the blades, rotation speed of the shaft, temperature of the hot gases, and the like).

The next step (block 220) envisages definition of a dynamic system S that describes the behaviour of the secondary-air circuit 7 as a whole, considering both the main components of flow and the auxiliary components of flow for each element of the secondary-air circuit 7 itself. The state variables are the flow rates Q in the branches 21 and the pressures P at the nodes 22 of the equivalent fluid-dynamic network 25, and the mathematical model is derived from equations of energy balance, continuity, and conservation of momentum.

Non-dynamic constraints are also defined (block 230), represented by algebraic or transcendental equations, which limit the domains of the state variables (for example, constraints imposed by constitutive equations of the cooling and work fluids or by the characteristic curves of loss of particular components of the secondary-air circuit, such as the turbine blades).

The non-dynamic constraints are modified by the introduction of fictitious singularities (poles) at frequencies that are higher, by several orders of magnitude, than the singularities proper to the dynamic system that describes the secondary-air circuit 7 (block 240). By way of example, an algebraic constraint on an element of the secondary-air circuit 7 can be imposed by the perfect-gas state equation:

$$PV - RT = 0 \quad (1)$$

where V and T are the specific volume and the temperature, respectively, of the coolant, and R is the universal perfect-gas constant. In this case, a fictitious pole is introduced with a time constant $\tau$. In the Laplace-transform domain, Eq. (1) is modified as follows (where s is a complex variable):

$$PV - RT = \frac{1}{1 + s\tau} \quad (2)$$

The introduction of fictitious singularities does not alter the behaviour of the dynamic system, provided that the associated fictitious transients expire with sufficient rapidity with respect to the transients of the state variables of the dynamic system. On the other hand, the constraint equations can be incorporated in the dynamic system to define a modified dynamic system without any algebraic constraints. The convergence of the modified dynamic system is hence advantageously favoured since the system is made up of equations that are all homogeneous with one another.

Figure 8:
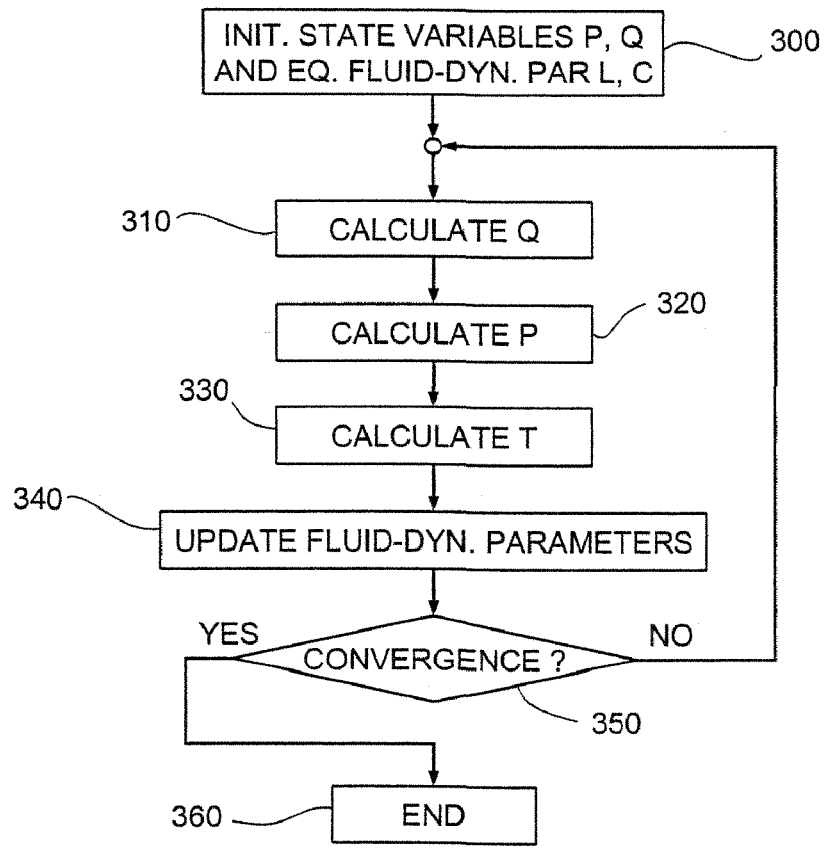
FIG. 8 is a more detailed flowchart of a part of the diagram of FIG. 3, regarding the execution of the method according to the present invention.

FIG. 8 illustrates a second iterative procedure for calculation of the secondary air flow rate $Q_{SA}$ (block 120 of FIG. 3) on the basis of the model described above. The second iterative procedure is nested in the first iterative procedure described in FIG. 3 (block 120) and is executed at each instant of simulation.

In a preliminary step (block 300), respective initialization values are assigned both to the state variables and to the equivalent fluid-dynamic parameters associated to the elements of the secondary-air circuit 7 (equivalent fluid-dynamic inductances L of the pipes 18 and equivalent fluid-dynamic capacitances C of the chambers 20).

Then (block 310), in each branch 22 of the secondary-air circuit 7 a single element is selected (a distributed loss of head, such as, for example, a pipe 18, or a concentrated loss), of which the flow rate Q (equal to the flow rate in the respective branch 22) is calculated. In the remaining elements of each branch 22, the pressure downstream or upstream of the element of loss itself is calculated.

The flow rates thus determined are used for calculating the pressures at the nodes 21 (block 320).

The steps of calculating the flow rates in the branches 22 and the pressures at the nodes 21 are based upon the use of the modified dynamic system described above, considering the temperatures of the coolant constant for the duration of each of the steps of calculating the flow rates in the branches 22 (block 310) and the pressures at the nodes 21 (block 320) of the second iterative procedure.

The temperature T of the coolant in the various sections of the secondary air circuit 7 (block 330) is then calculated.

The values of the equivalent fluid-dynamic capacitances of the chambers 20 are then updated (block 340) using the thermodynamic and fluid-dynamic conditions (flow rate Q, pressures P, and temperatures T) calculated previously (blocks 310, 320, and 330).

A convergence test (block 350) is then performed, by controlling the stability on a pre-determined number of iterations of the values of the flow rates and of the pressures calculated. If the convergence test is passed (output YES from block 350), the procedure terminates (block 360). Otherwise (output NO from block 350), a new iteration is run, using the updated values of the flow rates, of the pressures, and of the equivalent fluid-dynamic parameters. Preferably, the variations of the equivalent fluid-dynamic inductances L and of the equivalent fluid-dynamic capacitances C each time determined are applied progressively during a pre-set number of iterations. For example, if at a K-th iteration a variation $\Delta C$ of an equivalent fluid-dynamic capacitance is recorded, the corresponding value is adjusted progressively during N successive iterations by adding a contribution equal to $\Delta C/N$ at each iteration K+1, . . . , K+N.

The method described enables the analysis of secondary-air circuits of gas turbines to be carried out automatically and in a rapid and reliable way. The design and optimization of said circuits is hence simplified. In particular, the calculation of auxiliary components of flow, in addition to the principal component, enables correct evaluation of the influence of the mobile parts of the secondary-air circuit and, hence, the variation of pressure in the characteristic elements of loss within the shaft 6, such as the rotating passages.

The use of parametric curves and surfaces, which can be implemented by means of elements of a black-box type enables correct representation of operation of the cooled turbine blades, limiting the number of elements of the equivalent fluid network of the secondary-air circuit.

Also the precision of the analysis is thus improved. This is particularly advantageous because it is possible to refine the optimization of the secondary-air circuit and improve the efficiency of the entire gas-turbine plant.

Furthermore, the method enables observation of the evolution of the state variables and of the equivalent fluid-dynamic parameters also during the transients, as well as in stationary conditions.

Finally, it is evident that modifications and variations can be made to the method described herein, without thereby departing from the scope of the present invention, as defined in the annexed claims.

The invention claimed is:

1. A method of analysis of secondary-air circuits in gas-turbine plants, comprising:
   defining an equivalent fluid-dynamic network of a secondary-air circuit of a gas-turbine plant, the equivalent fluid-dynamic network including a plurality of elements organized in branches and connected to nodes; and
   calculating, for at least one element of the secondary-air circuit, a principal flow component and at least one auxiliary flow component.

2. The method according to claim 1, wherein the auxiliary flow component is perpendicular to the principal flow component.

3. The method according to claim 1, wherein the auxiliary flow component is correlated to an angular velocity of a shaft of the gas turbine.

4. The method according to claim 1, further comprising calculating a first auxiliary flow component and a second auxiliary flow component.

5. The method according to claim 1, further comprising:
connecting the secondary-air circuit to a compressor and to a turbine that are coupled together;
determining a compressor pressure at output from the compressor and a turbine pressure at input to the turbine; and
calculating a secondary air flow rate of the secondary-air circuit on the basis of a difference between the compressor pressure and the turbine pressure.

6. The method according to claim 1, further comprising defining a dynamic system associated to the equivalent fluid-dynamic network, wherein the dynamic system uses flow rates in the branches and pressures at the nodes of the equivalent fluid-dynamic network as state variables.

7. The method according to claim 6, wherein the defining a dynamic system comprises:
defining non-dynamic constraints; and
introducing at least one fictitious singularity into each non-dynamic constraint.

8. The method according to claim 6, further comprising:
associating a respective equivalent fluid-dynamic parameter to each element of the equivalent fluid-dynamic network;
calculating iteratively the flow rates in the branches and the pressures at the nodes of the equivalent fluid-dynamic network, using the equivalent fluid-dynamic parameters; and
updating values of the equivalent fluid-dynamic parameters at each iteration.

9. The method according to claim 8, wherein the updating comprises:
determining variations of the equivalent fluid-dynamic parameters; and
applying the variations of the equivalent fluid-dynamic parameters progressively during a pre-determined number of iterations.

10. The method according to claim 8, wherein the equivalent fluid-dynamic parameters comprise equivalent fluid-dynamic inductances and equivalent fluid-dynamic capacitances, respectively associated to pipes and to chambers of the secondary-air circuit.

* * * * *